(12) United States Patent
Le Marchand

(10) Patent No.: US 7,265,824 B2
(45) Date of Patent: Sep. 4, 2007

(54) METHOD AND DEVICE FOR OBTAINING A LOW-NOISE OPTICAL SIGNAL

(75) Inventor: Alain Le Marchand, Le Mesnil Saint Denis (FR)

(73) Assignee: Jobin Yvon S.A.S., Longjumeau (FR)

( * ) Notice: Subject to any disclaimer, the term of this patent is extended or adjusted under 35 U.S.C. 154(b) by 368 days.

(21) Appl. No.: 10/756,096

(22) Filed: Jan. 13, 2004

(65) Prior Publication Data

US 2004/0156046 A1   Aug. 12, 2004

(30) Foreign Application Priority Data

Jan. 13, 2003   (FR) .................................. 03 00313

(51) Int. Cl.
*G01J 3/36* (2006.01)
(52) U.S. Cl. ...................... 356/307; 356/306; 356/319
(58) Field of Classification Search ................ 356/307, 356/306, 319, 326, 323; 702/190–195
See application file for complete search history.

(56) References Cited

U.S. PATENT DOCUMENTS

| | | | | |
|---|---|---|---|---|
| 3,102,155 A | * | 8/1963 | Vallee | 356/307 |
| 3,729,259 A | * | 4/1973 | Cooper et al. | 356/307 |
| 3,820,898 A | * | 6/1974 | Olson | 356/307 |
| 3,837,744 A | * | 9/1974 | Egan et al. | 356/310 |
| 4,464,051 A | | 8/1984 | Talmadge et al. | |
| 5,022,755 A | * | 6/1991 | Wells et al. | 356/307 |
| 5,291,426 A | | 3/1994 | Collins et al. | |
| 6,643,011 B2 | * | 11/2003 | Kojima | 356/300 |

FOREIGN PATENT DOCUMENTS

EP   0344782   12/1989

OTHER PUBLICATIONS

John A. Leys, A method of Background Correction for Direct Reading Optical Emission Spectroscopic Trace Analysis Using Offset Exit Slits, Analytical Chemistry, vol. 41, No. 2, Feb. 1969, pp. 396-398.*
FR 0300313 International Search Repot dated Nov. 3, 2003.
S.A. Myers and D.H. TracyImproved Performance Using Internal Standardization in Inductively-Coupled Plasma Emission Spectroscopy Spectrochimica Acta vol. 38B pp. 1227-1253 (1983).

* cited by examiner

*Primary Examiner*—Layla G. Lauchman
(74) *Attorney, Agent, or Firm*—Anthony H. Handal; Brown Rudnick Berlack Israels LLP

(57) ABSTRACT

The invention relates to a method and a device for obtaining a low-noise optical signal.

According to the method, a luminous beam is injected through two apertures and after detection respectively a basic optical signal (21) and a corrective optical signal (22) are generated. Both optical signals obtained (21, 22) are subtracted, so that a resulting optical signal is generated, forming the low-noise optical signal. The apertures are preferably two slits of a spectroscope, the optical signals being expressible relative to the wavelength.

12 Claims, 1 Drawing Sheet

METHOD AND DEVICE FOR OBTAINING A LOW-NOISE OPTICAL SIGNAL

RELATED APPLICATIONS

This application claims priority to French Patent Application No. 03.00313 filed Jan. 13, 2003, which is incorporated herein by reference.

FIELD OF THE INVENTION

The present invention relates to spectroscopic analysis, more particularly, to a method and device for obtaining a low-noise optical signal.

BACKGROUND

In spectroscopic methods, it is conventional to perform spectral measurements on a system by letting through a luminous beam transmitted or sent back by this system through a slit. Scanning the slit then enables to cover a selected spectral domain.

The noise generated in the signals obtained is thus rather penalising, and obliges generally to implement different filtering techniques to obtain satisfactory results. The noise includes in particular a component with rapid fluctuations, i.e. over a small wavelength scale with respect to the bandwidths of the peaks of the signals (in particular smaller than one fifth of the bandwidths), and a low fluctuation component, i.e. over a great wavelength scale with respect to the bandwidth of the peaks (in particular 5 times greater). This second component of the noise includes notably a background noise, consisting of spurious intensity level, added to that of the signals.

SUMMARY

The different types of noise require generally distinct processes which aim at reducing the effects thereof.

This invention relates to a method for obtaining a low-noise optical signal enabling to eliminate almost completely the background noise, without resorting to complex filtering techniques, but authorising to use very simple digital procedures.

The method of the invention also enables to reduce substantially the random noise with rapid fluctuations or white noise.

The method of the invention also advantageously authorises considerable reduction of the measuring and calculation interval.

The invention also relates to a device for obtaining a low-noise optical signal having the advantages mentioned above, which may be realised by means of optical components available on the market and easy to be implemented.

In this view, the invention relates to a method for obtaining a low-noise optical signal. In this method:
a luminous beam is injected through an aperture,
the intensity of the beam is detected after going through the aperture, and
a basic optical signal is generated, representative of the intensity measured as a function of time.
According to the invention:
the luminous beam is also injected through another aperture,
another intensity of the beam is detected after going through the other aperture,
a corrective optical signal is generated, representative of the other intensity measured as a function of time, and both optical signals obtained are subtracted, so that a resulting optical signal is provided, forming the low-noise optical signal.

The subtraction of both optical signals obtained eliminates almost completely the background noise. Moreover, the absence of the background noise authorises considerable reduction of the measuring and processing interval, since the intensity reference is always 0.

The more so, the addition of complementary information on the beam, thanks to double measurement, takes the precedence over accumulation of the white noise of both signals used. Integration of the resulting signal enables to obtain a gain in the signal/white noise ratio of approximately $\sqrt{2}$.

Preferably, the apertures are two slits of a spectroscopic device, the optical signals being expressible relative to the wavelength.

In particular, the spectroscopic device comprises a rotary slit monochromator. Time scanning is thus assimilated to wavelength scanning.

Advantageously, both slits are arranged on the same plane, corresponding to the scanning plane.

The gap between both apertures is preferably optimised relative to the signals to be processed. In an advantageous embodiment, the basic optical signal comprising peaks of intensity having a full bandwidth at half maximum, the apertures are spaced apart so that they are separated by a gap corresponding to 2 to 4 times this bandwidth, and preferably approximately equal to 3 times.

The peaks of intensity of both optical signals are then sufficiently close so that the noise is reduced efficiently and sufficiently remote to prevent the subtraction of the signals from affecting the information on those peaks.

One then focuses advantageously on one of the peaks of intensity of the basic optical signal, and optical signals are generated over an interval (I) having a width slightly greater than the gap (D) between this peak of intensity and the corresponding peak of intensity of the corrective optical signal, said value being preferably comprised between 1.2 and 1.5 times said gap (D), and covering approximately these peaks of intensity.

To identify and to specify a given peak, this interval suffices, whereas in the presence of the background noise, considerably greater length is required to extract the peak of intensity.

Preferably, the resulting optical signal is time-integrated.

Thus the information obtained for both optical signals measured is associated, by replacing each of the couples of positive and negative peaks with a single peak of intensity. The signal obtained, wherein the signal/white noise ratio is multiplied by $\sqrt{2}$, lends itself to conventional digital processing cycles.

Time integration corresponds, when using spectroscopic applications, to spectral integration.

According to a first preferred embodiment, the intensities of the beam are detected simultaneously after going through both apertures.

One obtains thus complete information on both optical signals.

In a second preferred embodiment, the intensities of the beam are detected alternately after going through both apertures and the basic and corrective optical signals are reconstructed, preferably by integration.

This time chopping enables to use a single sensor instead of two. Then, time chopping should be selected judiciously for the alternate detection of both optical signals. The purpose indeed is not to damage the information obtained further to too slow an alternate cycle, while implanting the time chopping without too much complexity.

The invention also relates to a device for obtaining a low-noise optical signal. This device comprises:
- an aperture intended to be traversed by a luminous beam,
- means for detecting the intensity of this beam, arranged downstream of this aperture and capable of generating a basic optical signal representative of the intensity measured as a function of time, and
- a processing unit, capable of processing the basic optical signal.

According to the invention, the device comprises another aperture intended to be traversed by the luminous beam, the detection means are provided to also detect another intensity of the beam after going through the other aperture and to generate a corrective optical signal representative of the other intensity measured as a function of time. The processing unit is laid-out to subtract both optical signals obtained, in order to generate thus a resulting optical signal forming the low-noise optical signal.

The apertures are preferably the slits of a spectroscopic device.

In a first preferred embodiment, the detection means comprise two sensors, intended to detect respectively and simultaneously the beam after going through both apertures.

In a second preferred embodiment, the detection means comprise a sensor and a chopper interposed between the sensor and the apertures, the chopper being intended to let through alternately towards the sensor the beam after going through both aperture.

In this second embodiment, the device comprises advantageously an integrator, laid out to reconstruct the optical basic and corrective signals.

BRIEF DESCRIPTION OF THE DRAWINGS

The invention will be better understood and illustrated in the light of particular embodiments and examples of implementations without being limited thereto, with reference to the appended figures, whereon.

DETAILED DESCRIPTION

Figure 1:
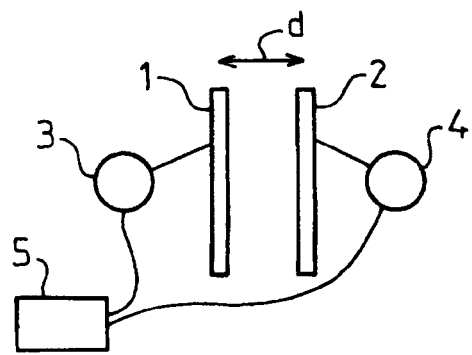
FIG. 1 represents schematically a first embodiment of a device according to the invention.
Figure 2:
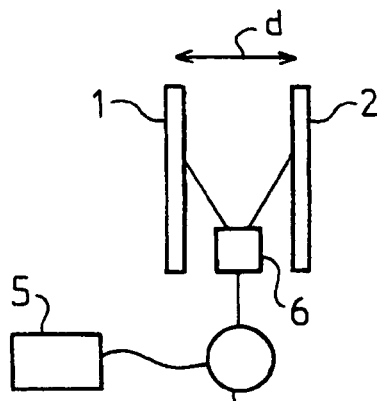
FIG. 2 represents schematically a second embodiment of a device according to the invention.

On FIGS. 1 and 2, identical or similar elements are designated by the same references.

A first embodiment of a spectroscopic device (FIG. 1) comprises two slits 1 and 2 spaced by a gap d. These slits 1 and 2 are for instance mobile slits intended to perform a wavelength scanning. The slits 1 and 2 are respectively coupled to two sensors 3 and 4, themselves connected to a processing unit 5.

In operation, a luminous beam is let through simultaneously through the slits 1 and 2, this beam being detected by the sensors 3 and 4 respectively after going through slits 1 and 2. Thus two spectral curves 21 and 22 (FIG. 3) are obtained, generated respectively by the sensors 3 and 4. These curves 21 and 22 provide the intensity of the signals detected (axis 12) as a function of the wavelength or the time (axis 11). In the presence of a wavelength significant of the system measured, each of the curves 21 and 22 exhibits a peak of intensity 15 and 16, having a bandwidth L at half the maximum. These peaks 15 and 16 are respectively centred on axes 13 and 14, spaced by a gap D. This gap D is directly in relation with the distance d between the slits 1 and 2, and also depends on the displacement velocity of the slits 1 and 2.

Preferably, the distance d is selected so that the gap D ranges between 2 and 4 times the bandwidth L. For exemplification purposes, the bandwidth L is 5 pm and the gap D is 15 pm.

Both curves 21 and 22 obtained include a white noise, as well as a background noise corresponding to a background intensity F. This background intensity F is approximately the same for both curves 21 and 22.

Figure 4:
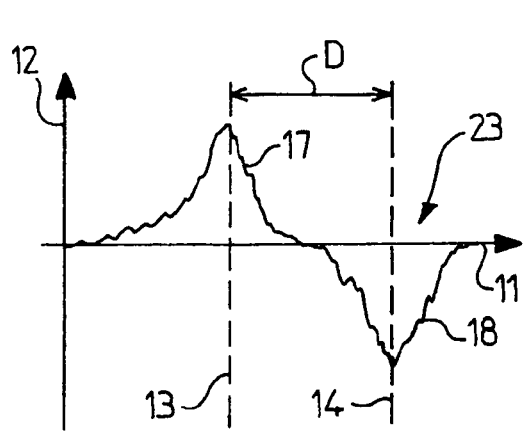
FIG. 4 represents the spectral curve of intensity resulting from the subtraction between both curves of FIG. 3, at reduced scale of intensity.

By means of the processing unit 5, the curve 22 is then subtracted from the curve 21, in order to obtain a curve 23 (FIG. 4) which thus accepts a positive peak 17 and a negative peak 18, respectively centred on the axes 13 and 14. The curve 23 exhibits the particularity of not containing any background noise any longer, the peaks 17 and 18 having their bases on the axis 11 corresponding to nil intensity.

Figure 5:
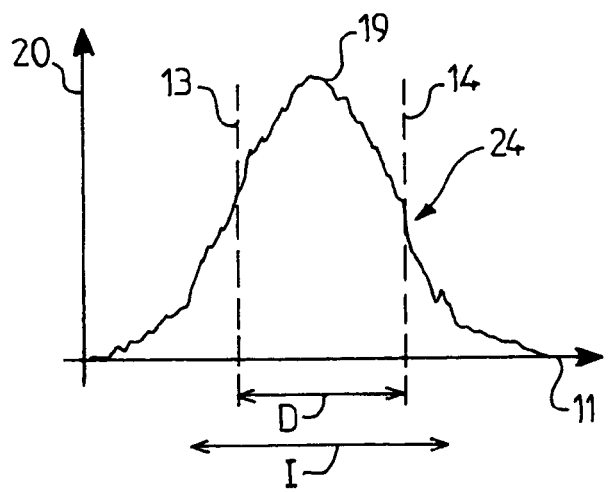
FIG. 5 represents a spectral curve corresponding to spectral integration of the curve of FIG. 4.

Then the curve 23 is integrated, so that a curve 24 is obtained (FIG. 5) generating the integration intensity (axis 20) as a function of the wavelength. This curve 24 accepts a peak 19 having its apex comprised between the axes 13 and 14 and two inflexion points at its intersections with the axes 13 and 14. The curve 24, deprived of a background noise such as the curve 23, has a signal/white noise ratio improved by a factor $\sqrt{2}$.

Figure 3:
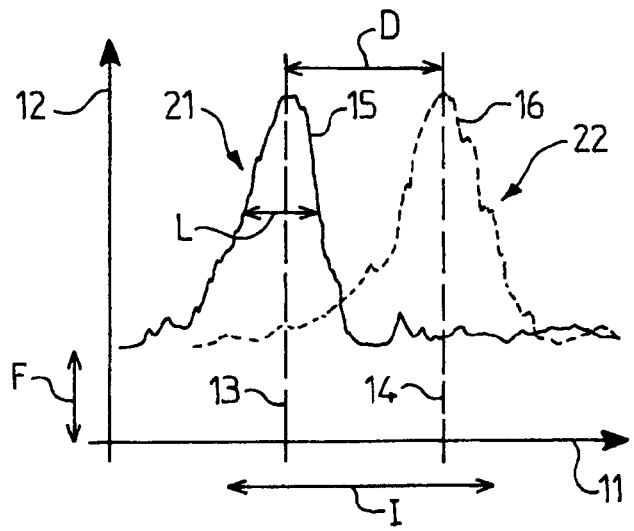
FIG. 3 represents two spectral curves of intensity obtained respectively by measuring a beam after going through two slits of the device of FIG. 1.

Advantageously, the wavelength measurements are performed only over an interval I centred on the peaks 15 and 16, therefore on the peak 19, and limited in the immediate vicinity of these peaks 21 and 22 (FIG. 3). Indeed, this small width interval I suffices to obtain the necessary information, because of the absence of background noise. For instance, the bandwidth L and the gap D being respectively 5 pm and 15 pm, the interval I has a width 20 pm only.

In a second embodiment of the spectroscopic device (FIG. 2), both slits 1 and 2 are coupled to a single sensor 7, a chopper 6 being interposed between the sensor 7 and the slits 1 and 2. The function of the chopper 6 consists in sending alternately to the sensor 7 the beam issued from the slits 1 and 2. The sensor 7 is itself connected to the processing unit 5.

In operation, curves similar to those of FIG. 3 are obtained, but hatched, which involves reconstruction of the curves on the missing portions. To do so, one uses advantageously an integrator. One then proceeds as in the first embodiment.

The invention claimed is:

1. A method for obtaining a low-noise optical signal in a two-slit spectroscopic device, comprising:
   (a) injecting into a first aperture of a two aperture scanning spectroscopic device a luminous beam emitted by a sample of said spectroscopic device;
   (b) detecting a first intensity of the luminous beam after the luminous beam passes through the first aperture;
   (c) generating, in response to said detecting a first intensity of the luminous beam after the luminous beam passes through the first aperture, a basic optical signal representative of said first intensity measured as a function of time, the basic optical signal comprising at least a first peak of intensity and having a full bandwidth at a half maximum;

(d) injecting the luminous beam through a second aperture of said spectroscopic device;

(e) detecting a second intensity of the beam after the beam passes through the second aperture;

(f) generating a corrective optical signal representative of the second intensity measured as a function of time, the corrective optical signal comprising at least a second peak of intensity and the first and second peaks of intensity being spaced by a gap; and (g) subtracting the first and second optical signal to obtain a resulting signal, the resulting signal comprising an output low-noise optical signal suitable for detection, display, control or other use, the first and second apertures being spaced by a distance so that the gap between the first peak of intensity of the basic optical signal and the second peak of intensity of the corrective optical signal corresponds to 2 to 4 times the bandwidth.

2. The method according to claim 1, wherein the first and second optical signals are expressible relative to the wavelength.

3. A method according to claim 1 wherein first and second apertures are spaced by the distance so that the gap between the first and second peaks of intensity corresponds to approximately 3 times the bandwidth.

4. A method according to claim 3, further comprising generating the basic optical signal and the corrective optical signal over an interval having a width slightly greater than the gap between the first peak of intensity and the second peak of intensity, the interval being between 1.2 and 1.5 times the gap and spanning approximately the first and second peaks of intensity.

5. A method according to any preceding claim, wherein the low-noise optical signal is time integrated.

6. A method according to claims 1, 2, 3, or 4 further comprising simultaneously detecting the first and second intensities of the beam after the beam passes through the first and second apertures.

7. A method according to claims 1, 2, 3, or 4 further comprising alternately detecting the first and second intensities of the beam after the beam passes through the first and second apertures and reconstructing the basic optical signal and the corrective optical signal by integration.

8. A device for obtaining a low-noise optical signal comprising:

a first aperture traversed by a luminous beam;

a detector for detecting a first intensity of the beam, the detector disposed downstream of the first aperture, the detector generating a basic optical signal, the basic optical signal representative of the first intensity measured as a function of time, the detector comprising a single sensor;

a processing unit capable of processing the basic optical signal; and a second aperture traversed by the luminous beam, the detector detecting a second intensity of the beam after the beam passes through the second aperture, the detector generating a corrective optical signal representative of the second intensity measured as a function of time, the processing unit subtracting the basic optical signal and the corrective optical signal generating a resulting signal, resulting signal including the low-noise optical signal.

9. The device according to claim 8, wherein in the first and second apertures comprise the slits of a spectroscopic device.

10. The device according to one either claims 8 or claim 9, wherein the detector comprise a chopper disposed between the sensor and the first and second aperture, the chopper alternately directing the beam passing through the first aperture and the beam passing through the second aperture towards the sensors.

11. The device according to either of claim 8 or claim 9, further comprising an integrator to reconstruct the basic optical signal and the corrective optical signal.

12. The device according to any one of claim 8 or claim 9, wherein the basic optical signal comprises at least a first peak of intensity and has a full bandwidth at a half maximum, and the corrective optical signal comprises at least a second peak of intensity, the first and second peaks of intensity being spaced by a gap, and the first and second apertures being spaced by a distance so that the gap between the first and second peaks of intensity corresponds to approximately 3 times the bandwidth.

* * * * *